United States Patent
Noh et al.

(10) Patent No.: US 8,735,312 B2
(45) Date of Patent: May 27, 2014

(54) CATALYST COMPOSITION AND PROCESS FOR PREPARING OLEFIN POLYMER USING THE SAME

(75) Inventors: Kyung-Seop Noh, Daejeon (KR); Hoon Chae, Daejeon (KR); Cheon-Il Park, Daejeon (KR); Won-Hee Kim, Daejeon (KR); Sang-Jin Jeon, Daejeon (KR); Eun-Jung Lee, Daejeon (KR); Choong-Hoon Lee, Daejeon (KR); Jong-Joo Ha, Daejeon (KR)

(73) Assignee: LG Chem, Ltd., Seoul (KR)

( * ) Notice: Subject to any disclaimer, the term of this patent is extended or adjusted under 35 U.S.C. 154(b) by 71 days.

(21) Appl. No.: 13/642,203

(22) PCT Filed: Apr. 25, 2011

(86) PCT No.: PCT/KR2011/002997
§ 371 (c)(1),
(2), (4) Date: Dec. 5, 2012

(87) PCT Pub. No.: WO2011/133005
PCT Pub. Date: Oct. 27, 2011

(65) Prior Publication Data
US 2013/0072646 A1    Mar. 21, 2013

(30) Foreign Application Priority Data
Apr. 23, 2010    (KR) .......................... 10-2010-0037746

(51) Int. Cl.
C08F 4/653 (2006.01)
C08F 4/6592 (2006.01)
C08F 10/00 (2006.01)

(52) U.S. Cl.
USPC ........... 502/113; 502/103; 502/128; 502/132; 502/152; 502/167; 526/113; 526/114; 526/133; 526/160; 526/161; 526/165; 526/348; 526/943

(58) Field of Classification Search
CPC ............ C08F 4/65904; C08F 4/65908; C08F 4/65912; C08F 4/6592; C08F 10/00
USPC ................. 502/103, 113, 128, 132, 152, 167; 526/113, 114, 133, 160, 161, 165, 348, 526/943
See application file for complete search history.

(56) References Cited

U.S. PATENT DOCUMENTS

2012/0196994 A1*   8/2012   Jeon et al. ..................... 526/133

FOREIGN PATENT DOCUMENTS

| | | |
|---|---|---|
| CN | 101213218 A | 7/2008 |
| CN | 101578293 A | 11/2009 |
| KR | 1020090063799 | 6/2009 |
| KR | 1020100104564 | 9/2010 |
| KR | 1020110009942 | 1/2011 |
| KR | 1020110118250 | 10/2011 |
| KR | 1020110118252 | 10/2011 |

OTHER PUBLICATIONS

"New Titanium Complexes Bearing Two Indolide-Imine Chelate Ligands for Polymerization of Ethylene" Matsugi et al. Macromolecules 2002, 35, 4880-4887.
Design of Schiff Base-Like Postmetallocene Catalytic Systems for Polymerization of Olefins: IV. Systhesis of 2-(Aryliminomethyl) pyrrole and 7-(Aryliminomethyl) indole Derivatives Containing Cycloalkyl Substituents; Kochnev; Russ J. Org. Chem, 2007, vol. 43, pp. 571-575.

* cited by examiner

*Primary Examiner* — Caixia Lu
(74) *Attorney, Agent, or Firm* — McKenna Long & Aldridge, LLP

(57) ABSTRACT

The present invention relates to a catalyst composition and a process for preparing an olefin polymer using the same. More specifically, the present invention relates to a novel catalyst composition comprising at least two types of catalysts and a process for preparing an olefin polymer having excellent heat resistance using the same. The present invention can provide an olefin polymer having excellent activity and high heat resistance, and also can control the values of density, heat resistance and melt index (MI) of the olefin polymer.

19 Claims, 1 Drawing Sheet

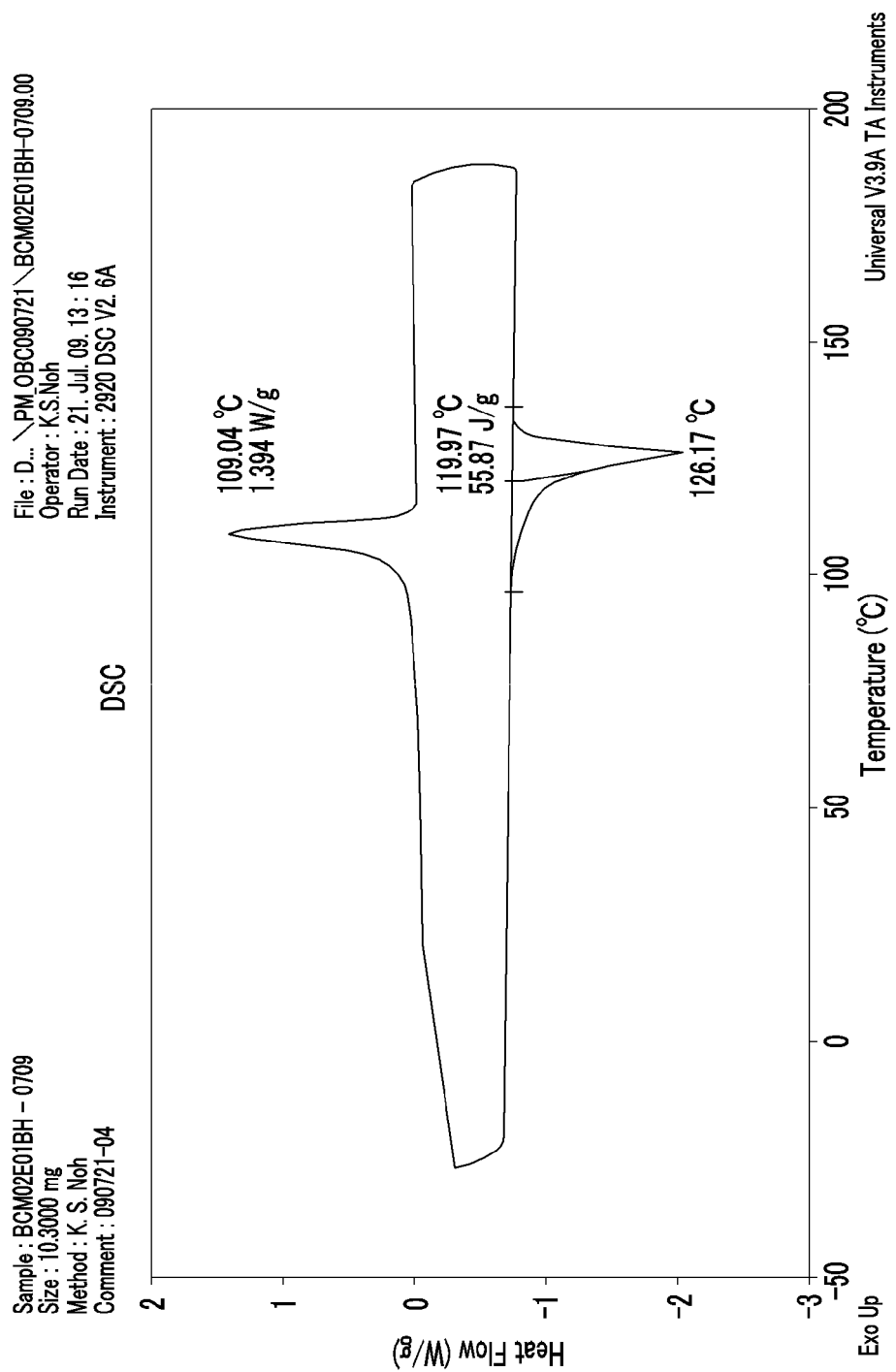

CATALYST COMPOSITION AND PROCESS FOR PREPARING OLEFIN POLYMER USING THE SAME

This application is a National Stage Entry of International Application No. PCT/KR2011/002997, filed Apr. 25, 2011, and claims the benefit of Korean Application No. 10-2010-0037746, filed on Apr. 23, 2010, which are hereby incorporated by reference in its entirety for all purposes as if fully set forth herein.

FIELD OF THE INVENTION

The present invention relates to a novel catalyst composition and a process for preparing an olefin polymer using the same.

BACKGROUND OF ART

Dow company reported [$Me_2Si(Me_4C_5)NtBu$]$TiCl_2$ (Constrained-Geometry Catalyst, CGC) in the early 1990s (U.S. Pat. No. 5,064,802). The advantages of CGC in comparison to the previously known metallocene catalysts in the copolymerization reaction of ethylene with alpha-olefin may be summarized into the following two: (1) it shows high activity even at a high polymerization temperature to result in a polymer having a high molecular weight, and (2) it gives excellent copolymerization of alpha-olefins having high steric hindrance such as 1-hexene and 1-octene. Besides the above, as several characteristics of CGC were gradually known, many derivatives thereof have been synthesized and actively used as a polymerization catalyst in academic and industrial fields.

As one approach thereof, it was tried to synthesize a metal compound to which other various bridges instead of a silicon bridge and nitrogen substituent were introduced and to use it for polymerization. Representative metal compounds known hitherto may be listed as follows (*Chem. Rev.* 2003, 103, 283).

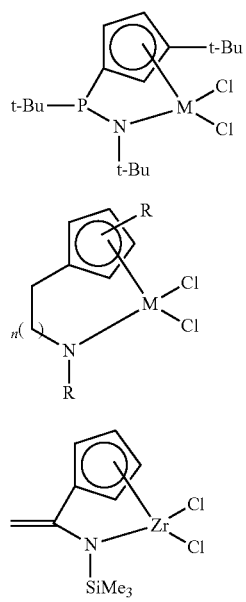

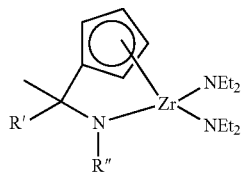

In the compounds listed above, phosphorus (1), ethylene or propylene (2), methylidene (3) and methylene (4) bridges are respectively introduced instead of the silicon bridge of the CGC structure. However, they do not show excellent results in the aspects of polymerization activity, copolymerization performance, etc. in comparison to CGC when they are applied to the ethylene polymerization or copolymerization of ethylene with alpha olefin.

As another approach, many compounds comprising an oxido ligand instead of the amido ligand of CGC have been synthesized, and some polymerizations using them have been tried. Examples thereof may be summarized as follows:

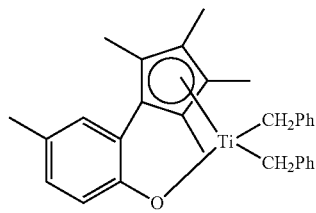

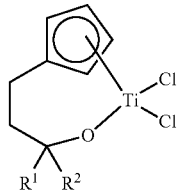

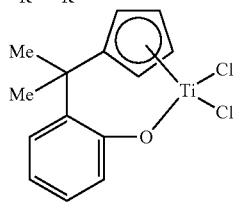

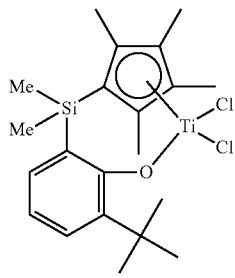

Compound (5) was reported by T. J. Marks, et al., and is characterized in that the Cp (cyclopentadiene) derivative and the oxido ligand are cross-linked via the ortho-phenylene group (*Organometallics* 1997, 16, 5958). A compound having the same cross-linking and polymerization using the same have been reported by Mu et al. (*Organometallics* 2004, 23, 540). Furthermore, a product produced by cross-linking an indenyl ligand and an oxido ligand via an ortho-phenylene group was reported by Rothwell, et al. (*Chem. Commun.* 2003, 1034). Compound (6) was reported by Whitby, et al. and is characterized by bridging the cyclopentadienyl ligand and the oxido ligand via three carbon atoms (*Organometallics* 1999, 18, 348). These catalysts were reported to show an activity for the syndiotactic polystyrene polymerization. A similar compound has also been reported by Hessen, et al. (*Organometallics* 1998, 17, 1652). Compound (7) was reported by Rau et al. and is characterized by showing the activity in the copolymerization of ethylene with ethylene/1-hexene at high temperature and pressure (210° C., 150 MPa) (*J. Organomet. Chem.* 2000, 608, 71). In addition, subsequently, catalysts having similar structures such as Compound (8) were provided, and polymerization using the same at high temperature and pressure was filed by Sumitomo company (U.S. Pat. No. 6,548,686).

However, among all the above trials, only a few catalysts are actually applied in the industrial companies. The polymers produced using the commercially available catalysts also have the disadvantage of poor heat resistance despite the high copolymer content. They usually have the melting point around 50° C. to 70° C. and thus show the demerit of not being suitable for the use requiring the heat resistance of 100° C. or more.

DISCLOSURE OF INVENTION

Technical Problem

In order to solve the problems of the above prior arts, the present invention provides a catalyst composition comprising a novel compound and provides an olefin polymer having the excellent activity and the feature of high heat resistance using the same.

Technical Solution

To achieve the above stated purpose, the present invention provides a novel catalyst composition comprising a compound having a ligand represented by the following formula (1) which is coordinated with a group IV transition metal; and a compound represented by the following formula (2), and a process for preparing the same.

The catalyst composition may further comprise one or more promoters selected from the group consisting of the compounds represented by the following formulas (3) to (5).

Also, the catalyst composition may further comprise one or more polymerization aids selected from the group consisting of an aluminum compound comprising a hydrocarbyl substituent having 1 to 12 carbon atoms, a zinc compound comprising a hydrocarbyl substituent having 1 to 12 carbon atoms and a gallium compound comprising a hydrocarbyl substituent having 1 to 12 carbon atoms.

In addition, the present invention provides a process for preparing an olefin polymer using the above catalyst composition:

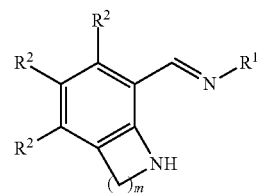

[Formula 1]

in the formula (1), m denotes an integer of 1 to 7, $R^1$ represents cycloalkyl having 4 to 10 carbon atoms which is substituted by one or more substituents selected from the group consisting of hydrogen, deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms, and heterocycle having 4 to 20 carbon atoms; heterocycle having 3 to 9 carbon atoms which is substituted by one or more substituents selected from the group consisting of hydrogen, deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms, and heterocycle having 4 to 20 carbon atoms and which contains oxygen (O), nitrogen (N) or sulfur (S) as the hetero atom; aryl having 6 to 10 carbon atoms which is substituted by one or more substituents selected from the group consisting of hydrogen, deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms, and heterocycle having 4 to 20 carbon atoms; or heteroaryl having 5 to 10 carbon atoms which is substituted by one or more substituents selected from the group consisting of hydrogen, deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms, and heterocycle having 4 to 20 carbon atoms and which contains oxygen (O), nitrogen (N) or sulfur (S) as the hetero atom; wherein the groups adjacent to each other may form an aliphatic condensed ring or an aromatic condensed ring when $R^1$ is substituted by two or more substituents;

$R^2$ is the same or different and independently of one another is selected from the group consisting of hydrogen, deuterium, halogen, nitrile, acetylene, amine, amide, ester, ketone, alkyl having 1 to 20 carbon atoms, alkenyl having 2 to 20 carbon atoms, aryl having 6 to 20 carbon atoms, heterocycle having 4 to 20 carbon atoms, alkoxy having 1 to 20 carbon atoms and aryloxy having 6 to 20 carbon atoms; and two or more $R^2$s may be combined with each other to form an aliphatic or aromatic ring;

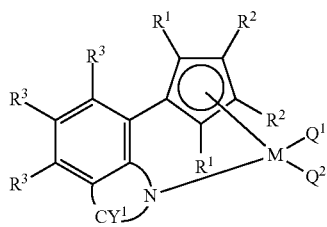

[Formula 2]

in the formula (2), $R^1$ and $R^2$ independently of one another represent hydrogen, alkyl having 1 to 20 carbon atoms, aryl having 1 to 20 carbon atoms, silyl, alkenyl having 1 to 20 carbon atoms, alkylaryl having 1 to 20 carbon atoms, arylalkyl having 1 to 20 carbon atoms, or a metalloid radical of group XIV metal which is substituted by hydrocarbyl; and said $R^1$ and $R^2$ may be combined with each other via an alkylidene radical including alkyl having 1 to 20 carbon atoms or aryl having 1 to 20 carbon atoms to form a ring;

$R^3$ independently of one another represents hydrogen, halogen, alkyl having 1 to 20 carbon atoms, aryl having 1 to 20 carbon atoms, alkoxy having 1 to 20 carbon atoms, aryloxy having 1 to 20 carbon atoms or amido; and two or more $R^3$s may be combined with each other to form an aliphatic or aromatic ring;

$CY^1$ represents a substituted or unsubstituted aliphatic or aromatic ring;

M represents a group IV transition metal;

$Q^1$ and $Q^2$ independently of one another represent halogen, alkyl having 1 to 20 carbon atoms, arylamido having 1 to 20 carbon atoms, alkenyl having 1 to 20 carbon atoms, aryl having 1 to 20 carbon atoms, alkylaryl having 1 to 20 carbon atoms, arylalkyl having 1 to 20 carbon atoms or alkylidene having 1 to 20 carbon atoms;

$$J(R^4)_3 \quad \text{[Formula 3]}$$

in the formula (3),

J represents aluminum or boron;

$R^4$ independently of one another represents halogen, or a hydrocarbyl radical which is unsubstituted or substituted by halogen and has 1 to 20 carbon atoms;

$$[L-H]^+[ZA_4]^- \text{ or } [L]^+[ZA_4]^- \quad \text{[Formula 4]}$$

in the formula (4),

L represents a neutral or cationic Lewis acid;

H represents hydrogen;

Z represents a group XIII atom;

A independently of one another represents alkyl having 1 to 20 carbon atoms or aryl having 6 to 20 carbon atoms wherein one or more hydrogen atoms are replaced by halogen, hydrocarbyl having 1 to 20 carbon atoms, alkoxy having 1 to 20 carbon atoms or phenoxy;

$$-[Al(R^5)-O]_a- \quad \text{[Formula 5]}$$

in the formula (5), $R^5$ represents halogen, or hydrocarbyl which is unsubstituted or substituted by halogen and has 1 to 20 carbon atoms; and a denotes an integer of 2 or more.

Advantageous Effects

According to the present invention, there can be provided a novel catalyst composition and also an elastomer having excellent activity and high heat resistance prepared by using said catalyst composition. The olefin polymer of the present invention can supplement the demerits of the earlier olefin copolymers having relatively excellent elasticity but inferior heat resistance.

BRIEF DESCRIPTION OF DRAWINGS

FIG. 1 represents a graph showing the melting point and heat of fusion of the olefin polymer prepared by using the catalyst composition according to one example of the present invention.

DETAILED DESCRIPTION OF THE INVENTION

Hereinafter, the present invention will be illustrated more in detail.

The catalyst composition for olefin polymerization according to the present invention is characterized by comprising a compound having a ligand of the following formula (1) coordinated with a group IV transition metal; and a compound of the following formula (2).

The catalyst composition according to the present invention may further comprise one or more promoters selected from the group consisting of the compounds of the following formulas (3) to (5).

Also, the catalyst composition according to the present invention may further comprise one or more polymerization aids selected from the group consisting of an aluminum compound comprising a hydrocarbyl substituent having 1 to 12 carbon atoms, a zinc compound comprising a hydrocarbyl substituent having 1 to 12 carbon atoms and a gallium compound comprising a hydrocarbyl substituent having 1 to 12 carbon atoms:

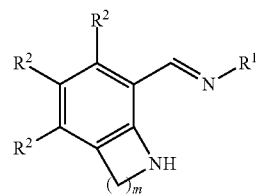

[Formula 1]

in the formula (1), m denotes an integer of 1 to 7, $R^1$ represents cycloalkyl having 4 to 10 carbon atoms which is substituted by one or more substituents selected from the group consisting of hydrogen, deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms, and heterocycle having 4 to 20 carbon atoms; heterocycle having 3 to 9 carbon atoms which is substituted by one or more substituents selected from the group consisting of hydrogen, deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms, and heterocycle having 4 to 20 carbon atoms and which contains oxygen (O), nitrogen (N) or sulfur (S) as the hetero atom; aryl having 6 to 10 carbon atoms which is substituted by one or more substituents selected from the group consisting of hydrogen, deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms, and heterocycle having 4 to 20 carbon atoms; or heteroaryl having 5 to 10 carbon atoms which is substituted by one or more substituents selected from the group consisting of hydrogen, deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms, and heterocycle having 4 to 20 carbon atoms and which contains oxygen (O), nitrogen (N) or sulfur (S) as the hetero atom; wherein the groups adjacent to each other may form an aliphatic condensed ring or an aromatic condensed ring when $R^1$ is substituted by two or more substituents;

$R^2$ is the same or different and independently of one another is selected from the group consisting of hydrogen, deuterium, halogen, nitrile, acetylene, amine, amide, ester, ketone, alkyl having 1 to 20 carbon atoms, alkenyl having 2 to 20 carbon atoms, aryl having 6 to 20 carbon atoms, heterocycle having 4 to 20 carbon atoms, alkoxy having 1 to 20 carbon atoms and aryloxy having 6 to 20 carbon atoms; and two or more $R^2$s may be combined with each other to form an aliphatic or aromatic ring;

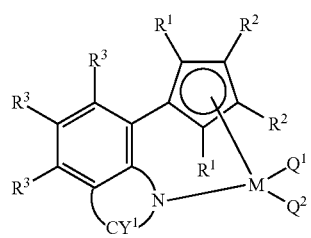

[Formula 2]

in the formula (2), $R^1$ and $R^2$ independently of one another represent hydrogen, alkyl having 1 to 20 carbon atoms, aryl having 1 to 20 carbon atoms, silyl, alkenyl having 1 to 20 carbon atoms, alkylaryl having 1 to 20 carbon atoms, arylalkyl having 1 to 20 carbon atoms, or a metalloid radical of group XIV metal which is substituted by hydrocarbyl; and said $R^1$ and $R^2$ may be combined with each other via an alkylidene radical including alkyl having 1 to 20 carbon atoms or aryl having 1 to 20 carbon atoms to form a ring;

$R^3$ independently of one another represents hydrogen, halogen, alkyl having 1 to 20 carbon atoms, aryl having 1 to 20 carbon atoms, alkoxy having 1 to 20 carbon atoms, aryloxy having 1 to 20 carbon atoms or amido; and two or more $R^3$s may be combined with each other to form an aliphatic or aromatic ring;

$CY^1$ represents a substituted or unsubstituted aliphatic or aromatic ring;

M represents a group IV transition metal;

$Q^1$ and $Q^2$ independently of one another represent halogen, alkyl having 1 to 20 carbon atoms, arylamido having 1 to 20 carbon atoms, alkenyl having 1 to 20 carbon atoms, aryl having 1 to 20 carbon atoms, alkylaryl having 1 to 20 carbon atoms, arylalkyl having 1 to 20 carbon atoms or alkylidene having 1 to 20 carbon atoms;

$$J(R^4)_3 \qquad \text{[Formula 3]}$$

in the formula (3),

J represents aluminum or boron;

$R^4$ independently of one another represents halogen, or a hydrocarbyl radical which is unsubstituted or substituted by halogen and has 1 to 20 carbon atoms;

$$[L-H]^+[ZA_4]^- \text{ or } [L]^+[ZA_4]^- \qquad \text{[Formula 4]}$$

in the formula (4),

L represents a neutral or cationic Lewis acid;

H represents hydrogen;

Z represents a group XIII atom;

A independently of one another represents alkyl having 1 to 20 carbon atoms or aryl having 6 to 20 carbon atoms wherein one or more hydrogen atoms are replaced by halogen, hydrocarbyl having 1 to 20 carbon atoms, alkoxy having 1 to 20 carbon atoms or phenoxy;

$$-[Al(R^5)-O]_a- \qquad \text{[Formula 5]}$$

in the formula (5), $R^5$ represents halogen, or hydrocarbyl which is unsubstituted or substituted by halogen and has 1 to 20 carbon atoms; and a denotes an integer of 2 or more.

The substituents for the above formulas (1) to (5) each are specifically explained below.

The alkyl group includes the straight-chain or branched alkyl.

The alkenyl group includes the straight-chain or branched alkenyl.

Unlimited examples of the silyl group include trimethylsilyl, triethylsilyl, tripropylsilyl, tributylsilyl, trihexylsilyl, triisopropylsilyl, triisobutylsilyl, triethoxysilyl, triphenylsilyl, tris(trimethylsilyl)silyl, etc.

The aryl group preferably has 6 to 20 carbon atoms, and unlimited examples thereof include phenyl, naphthyl, anthracenyl, pyridyl, dimethylanilinyl, anisolyl, etc.

The alkylaryl group means aryl substituted by the above alkyl.

The arylalkyl group means alkyl substituted by the above aryl.

The halogen group means fluorine, chlorine, bromine or iodine.

The alkylamino group means amino substituted by the above alkyl, and unlimited examples thereof include dimethylamino, diethylamino, etc.

The arylamino group means amino substituted by the above aryl, and unlimited examples thereof include diphenylamino, etc.

The catalyst composition according to the present invention comprises the compound of formula (2) as a catalyst component for preparing the elastomer; and the compound having a ligand of formula (1) coordinated with a group IV transition metal as the catalyst component for preparing the heat-resistant polymer.

As a result of repeated studies on the catalysts for olefin polymerization by the inventors of the present invention, when olefin polymers, preferably olefin block copolymers, are prepared by using the present catalyst composition, the monomers capable of providing a hard segment form blocks due to the compound having a ligand of formula (1) coordinated with a group IV transition metal, and the monomers capable of providing a soft segment form blocks due to the compound of formula (2), giving a high degree of block formation.

If the catalyst composition of the present invention is used in this way, the olefin polymer shows a high degree of block formation so that the hard and soft segments may be discriminated more definitely and the content of hard segment may be increased to give a polymer having high degree of crystallinity and high melting point. Thus, the olefin polymer prepared by using the present catalyst composition can keep the basic elasticity and also can exhibit heat resistance more improved than the previously known polymers.

The compound having a ligand of formula (1) coordinated with a group IV transition metal, as a component contained in the catalyst composition of the present invention, will be explained more in detail below.

The compound of formula (1) may have the following formula (1-1) or (1-2):

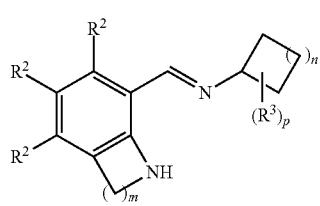

[Formula 1-1]

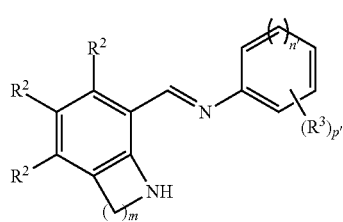

[Formula 1-2]

in the formula (1-1) or (1-2), m and $R^2$ are as defined in the formula (1), n denotes an integer of 1 to 7, n' denotes an integer of 1 to 5, p denotes an integer of 0 to 2+n, p' denotes an integer of 0 to 5+n', $R^3$ is the same or different and independently of one another is preferably selected from the group consisting of deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms and heterocycle having 4 to 20 carbon atoms; and two or more $R^3$s may be combined with each other to form an aliphatic or aromatic ring.

In particular, $R^3$ in the formula (1-1) or (1-2) is preferably alkyl having 1 to 20 carbon atoms, cycloalkyl having 6 to 20 carbon atoms, alkenyl having 2 to 20 carbon atoms or aryl having 6 to 20 carbon atoms; and two or more $R^3$s may be combined with each other to form an aliphatic or aromatic ring.

In addition, in the formulas (1), (1-1) and (1-2), m is preferably 2 or 3. Also, in the formulas (1-1) and (1-2), n is preferably 2 or 3. Also, in the formulas (1-1) and (1-2), n' is preferably an integer of 1 to 3.

More preferably, the compound of formula (1) may be one or more selected from the group consisting of the compounds of the following formula (1-3). However, the compound of formula (1) in the present invention is not limited to these compounds only.

[Formula 1-3]

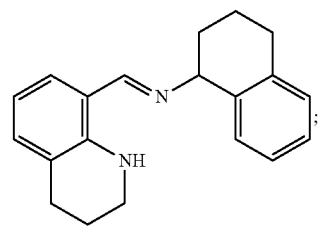

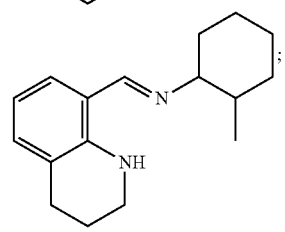

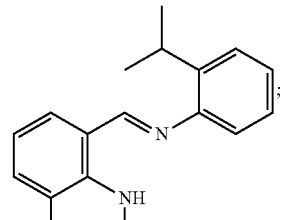

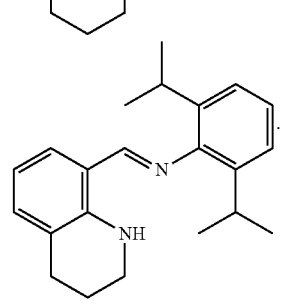

On the other hand, according to one embodiment of the present invention, the compound of formula (1) can be prepared by the process of Reaction Scheme (1). However, the present invention is not limited thereto:

[Reaction Scheme 1]

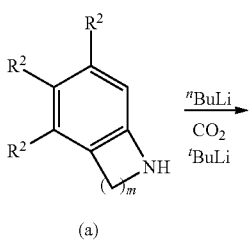

(a)

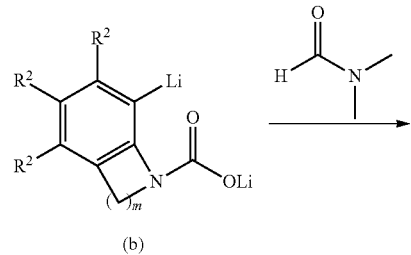

(b)

-continued

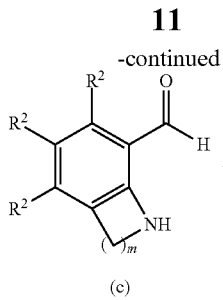

(c)

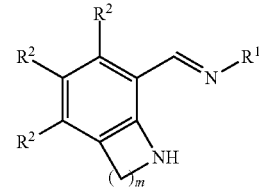

in the above Reaction Scheme (1), $R^1$ and $R^2$ are as defined in the formula (1).

In the above Reaction Scheme (1), the starting Compound (a) is converted to the intermediate Compound (b) via the selective lithium-substitution process, to which may be introduced DMF (N,N-Dimethylformamide) to give Compound (c). Subsequently, Compound (c) may be reacted with $R^1$—$NH_2$ under reflux and stirring to give the compound of formula (1). In particular, in the case of using the compound $R^1$—$NH_2$ wherein $R^1$ is aryl, 4A MS may be introduced before the mixture is refluxed overnight to give the product. In the case that $R^1$ is alkyl or alkylaryl, the mixture may be stirred overnight at room temperature to give the product.

The compound of formula (1) prepared according to the above process may be a ligand compound capable of forming a bidentate chelate (NN chelate) or a tridentate chelate (NNN, NNO or NNC), with a metal depending on the type of $R^1$.

The compound used in the catalyst composition of the present invention is an organometallic compound wherein the ligand compound of formula (1) is coordinated with a group IV transition metal. Unlimited examples of the transition metal include Ti, Zr, Hf, etc.

According to one embodiment of the present invention, the organometallic compound may be one or more selected from the group consisting of the compounds of the following formula (1-4), but not limited thereto:

[Formula 1-4]

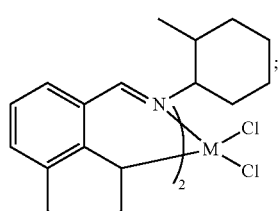

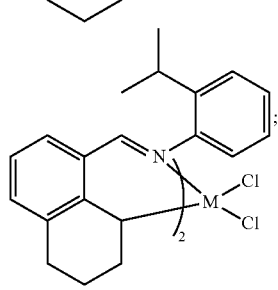

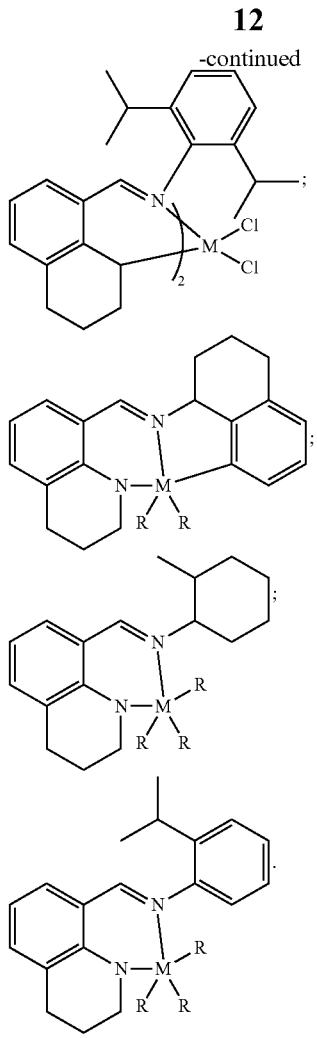

in the formula (1-4),

M represents a group IV transition metal,

R is the same or different and independently of one another may be selected from the group consisting of hydrogen, deuterium, halogen, nitrile, acetylene, amine, amide, ester, ketone, alkyl having 1 to 20 carbon atoms, alkenyl having 2 to 20 carbon atoms, aryl having 6 to 20 carbon atoms, heterocycle having 4 to 20 carbons, alkoxy having 1 to 20 carbon atoms and aryloxy having 6 to 20 carbon atoms.

As can be seen from the formula (1-4), the molar ratio between ligand and metal in the compound having a ligand of formula (1) coordinated with a group IV transition metal may be about 2:1 which is same as, or about 1:1 which is different from, the earlier catalysts. Due to the structural feature as above, the catalyst composition according to the present invention may have the transition metal whose content is equal to or more than the earlier catalyst composition.

On the other hand, according to one embodiment of the present invention, the compound having a ligand of formula (1) coordinated with a group IV transition metal may be prepared in the following process. However, the present invention is not limited thereto.

First, a certain amount of the ligand of formula (1) and about 1.05 eq. of a metal precursor are mixed and added to a suitable amount of toluene solvent at about −75° C. to −80° C., preferably at about −78° C. The mixture is stirred for about 6 h to 2 days during which the temperature is slowly raised to room temperature. Then, the solvent is removed, or when the amount of solvent introduced is known, the desired organometallic compound can be obtained as a solution.

On the other hand, the catalyst composition of the present invention comprises the compound of formula (2) as a component.

The compound of formula (2) is preferably a compound of the following formula (2-1), taking into account the control of electronic and steric circumstances around the metal in the formula (1):

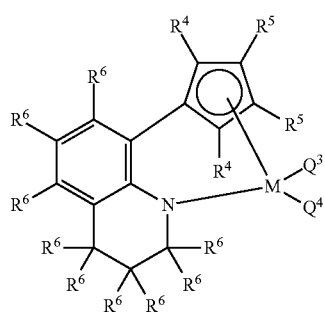

[Formula 2-1]

in the formula (2-1), $R^4$ and $R^5$ independently of one another represent hydrogen, alkyl having 1 to 20 carbon atoms, aryl having 1 to 20 carbon atoms, or silyl;

$R^6$ independently of one another represents alkyl having 1 to 20 carbon atoms, aryl having 1 to 20 carbon atoms, alkenyl having 1 to 20 carbon atoms, alkylaryl having 1 to 20 carbon atoms, arylalkyl having 1 to 20 carbon atoms, alkoxy having 1 to 20 carbon atoms, aryloxy having 1 to 20 carbon atoms or amido, and two or more $R^6$s may be combined with each other to form an aliphatic or aromatic ring;

$Q^3$ and $Q^4$ independently of one another represent halogen, alkyl having 1 to 20 carbon atoms, arylamido having 1 to 20 carbon atoms, alkenyl having 1 to 20 carbon atoms or aryl having 1 to 20 carbon atoms; and M represents a group IV transition metal.

The compound of the formula (2) or (2-1) has the structural feature that the amido group and the amino or alkoxy group are linked via the phenylene bridge to form a narrow angle of Cp-M-E, but a wide angle of $Q^1$-M-$Q^2$ to which a monomer accesses, whereby a monomer having a big size can easily access. Also, differently from the CGC structure which is linked via silicon bridge, the compound of formula (1) has a stable and solid hexagonal ring structure comprising, for example, oxygen, phenylene bridge and nitrogen along with the metal site. Thus, if such compounds are reacted with a promoter such as methyl aluminoxane or $B(C_6F_5)_3$ to be activated and then applied to the olefin polymerization, an olefin polymer having the characteristics such as high activity, high molecular weight and high copolymerization, etc. may be produced even at a high polymerization temperature.

Also, in the catalyst composition according to the present invention, the compound of formula (2) may be contained with respect to the compound having a ligand of formula (1) coordinated with a group IV transition metal in the molar ratio of 1:0.01 to 1:15, preferably in the molar ratio of 1:0.1 to 1:10, more preferably in the molar ratio of 1:0.1 to 1:5. That is, it is preferable for the catalyst composition to comprise the compounds in the above stated range for obtaining the olefin polymer having the desired physical properties with sufficiently converting the monomers to hard and soft segments.

On the other hand, the catalyst composition according to the present invention may further comprise one or more promoter compounds selected from the group consisting of the compounds of the following formulas (3) to (5).

$$J(R^4)_3 \quad \text{[Formula 3]}$$

in the formula (3),

J represents aluminum or boron;

$R^4$ independently of one another represents halogen, or a hydrocarbyl radical which is unsubstituted or substituted by halogen and has 1 to 20 carbon atoms;

$$[L-H]^+[ZA_4]^- \text{ or } [L]^+[ZA_4]^- \quad \text{[Formula 4]}$$

in the formula (4),

L represents a neutral or cationic Lewis acid;

H represents hydrogen;

Z represents a group XIII atom;

A independently of one another represents alkyl having 1 to 20 carbon atoms or aryl having 6 to 20 carbon atoms wherein one or more hydrogen atoms are replaced by halogen, hydrocarbyl having 1 to 20 carbon atoms, alkoxy having 1 to 20 carbon atoms or phenoxy;

$$-[Al(R^5)-O]_a- \quad \text{[Formula 5]}$$

in the formula (5), $R^5$ represents halogen, or hydrocarbyl which is unsubstituted or substituted by halogen and has 1 to 20 carbon atoms; and a denotes an integer of 2 or more.

The catalyst composition according to the present invention may exist in the state activated by the promoter compound, and thus is also called as an activated catalyst composition. However, it has been known in the art that the catalyst composition exists in the activated state, the expression of activated catalyst composition will not be specially used herein.

According to one embodiment of the present invention, the compound of formula (3) is not specially limited if it is an alkyl metal compound, but may preferably include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, etc.; more preferably include trimethylaluminum, triethylaluminum, triisobutylaluminum, etc.

Also, the compound of formula (4) may include triethylammoniumtetra(phenyl)boron, tributylammoniumtetra(phenyl)boron, trimethylammoniumtetra(phenyl)boron, tripropylammoniumtetra(phenyl)boron, trimethylammoniumtetra(p-tolyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetra(pentafluorophenyl)boron, N,N-diethylaniliniumtetra(phenyl)boron, N,N-diethylaniliniumtetra(pentafluorophenyl)boron, diethylammoniumtetra(pentafluorophenyl)boron, trimethylphosphoniumtetra(phenyl)boron, triethylammoniumtetra(phenyl)aluminum, tributylammoniumtetra(phenyl)aluminum, trimethylammoniumtetra(phenyl)aluminum, tripropylammoniumtetra(phenyl)aluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetra(pentafluorophenyl)aluminum, N,N-diethylaniliniumtetra(phenyl)aluminum, N,N-diethylaniliniumtetra(phenyl)aluminum, N,N-diethylaniliniumtetra(pentafluorophenyl)aluminum, diethylammoniumtetra(pentafluorophenyl)aluminum, triphenylphosphoniumtetra(phenyl)aluminum, trimethylphosphoniumtetra(phenyl)aluminum, triethylammoniumtetra(phenyl)aluminum, tributylammoniumtetra(phenyl)aluminum, tripropylammoniumtetra(p-tolyl)boron, triethylammoniumtetra(o,p-dimethylphenyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetra(pentafluorophenyl)boron, N,N-diethylaniliniumtetra(phenyl)boron, triphenylphosphoniumtetra(phenyl)boron, triphenylcarboniumtetra(p-trifluoromethylphenyl)boron, triphenylcarboniumtetra(pentafluorophenyl)boron, trityltetra(pentafluorophenyl)boron, trityltetrakis(pentafluorophenyl)borate, etc.

Also, the compound of formula (5) is not specially limited if it is an alkylaluminoxane, but preferably may include methylaluminoxane, ethylaluminoxane, is obutylaluminoxane, butylaluminoxane, etc.; more preferably may include methylaluminoxane.

In particular, according to the present invention, the promoter compound may be contained with respect to the compound having a ligand of formula (1) coordinated with a group IV transition metal and the compound of formula (2) (main catalyst compounds, below) in the molar ratio of about 1:1 to about 1:20, preferably in the molar ratio of about 1:1 to about 1:18, more preferably in the molar ratio of about 1:1 to about 1:15.

That is, the promoter compound is an alkylating agent, and is preferably contained with respect to said main catalyst compounds in the molar ratio of about 1:1 or more so that the alkylation of the main catalyst compounds may be sufficiently proceeded by the promoter compound. Also, when the promoter compound is added in an excessive amount, the control of physical properties of the polymer may become difficult, and particularly, the activation of the alkylated main catalyst compounds may not be completely achieved. In order to prevent such a result, the promoter compound is preferably contained with respect to the main catalyst compounds in the molar ratio of 1:20 or less.

Meanwhile, in order to prepare an elastomer having more excellent heat resistance, the catalyst composition of the present invention may further comprise a polymerization aid.

Herein, the polymerization aid may be one or more compounds selected from the group consisting of an aluminum compound comprising a hydrocarbyl substituent having 1 to 12 carbon atoms, a zinc compound comprising a hydrocarbyl substituent having 1 to 12 carbon atoms and a gallium compound comprising a hydrocarbyl substituent having 1 to 12 carbon atoms; and preferably triethylaluminum or diethylzinc.

By adding such a polymerization aid, it is possible to prepare a polymer wherein crystallinity of its molecular structure is increased and the content of comonomer is increased so that the polymer may have a density of about 0.9 g/ml or less and a high melting point. This is because the polymerization aid can assist the alternating action of the compound having a ligand of formula (1) coordinated with a group IV transition metal and the compound of formula (2) to assist the alternating formation of plural segments forming the olefin polymer, e.g., hard and soft segments. In other words, by the action of such a polymerization aid, the degree of block formation is increased and accordingly an olefin polymer having higher melting point and heat resistance can be prepared.

The polymerization aid may be contained with respect to the compound having a ligand of formula (1) coordinated with a group IV transition metal and the compound of formula (2) (main catalyst compounds, below) in the molar ratio of about 1:10 to about 1:1000, preferably in the molar ratio of about 1:10 to about 1:500, more preferably in the molar ratio of about 1:20 to about 1:200.

That is, the polymerization aid is preferably contained with respect to said main catalyst compounds in the molar ratio of about 1:10 or more so that the least effect can be obtained. Also, when the polymerization aid is added in an excessive amount, the activity of main catalyst compounds and the physical properties of polymer may be deteriorated. In order to prevent such a result, the polymerization aid is preferably contained with respect to the main catalyst compounds in the molar ratio of 1:1000 or less.

The catalyst composition of the present invention as explained above may be used in the state of being immersed in silica, alumina, etc. Also, the catalyst composition may be used for preparing olefin monopolymers or copolymers (preferably, block copolymers).

On the other hand, according to one embodiment of the present invention, there is provided a process for preparing the catalyst composition for olefin polymerization, which comprises a step of obtaining a mixture by contacting the compound having a ligand of formula (1) coordinated with a group IV transition metal and the compound of formula (2) with one or more promoter compounds selected from the group consisting of the compounds of formulas (3) to (5).

According to another embodiment of the present invention, the process for preparing the catalyst composition may comprise the steps of obtaining a mixture by contacting the compound having a ligand of formula (1) coordinated with a group IV transition metal and the compound of formula (2) with the promoter compound selected from the group consisting of the compounds of formulas (3) to (5); and adding one or more polymerization aids selected from the group consisting of an aluminum compound comprising a hydrocarbyl substituent having 1 to 12 carbon atoms, a zinc compound comprising a hydrocarbyl substituent having 1 to 12 carbon atoms and a gallium compound comprising a hydrocarbyl substituent having 1 to 12 carbon atoms to said mixture.

In the preparation of the catalyst composition, as the reaction solvent, a hydrocarbon solvent such as pentane, hexane, heptane, etc.; or an aromatic solvent such as benzene, toluene, etc. may be used. However, the solvent is not limited thereto, and any solvent that can be used in this field may be selected.

On the other hand, according to another embodiment of the present invention, there is provided a process for preparing an olefin polymer, which comprises a step of polymerizing olefin monomers in the presence of said catalyst composition for olefin polymerization.

As the olefin monomer in this process for preparing the olefin polymer, ethylene, alpha-olefin, cyclic olefin, etc. may be used; and also diene or triene olefin monomers, etc. having two or more double bonds can be polymerized.

Preferably, the olefin monomer may be one or more selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-itocene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene and 3-chloromethylstyrene; and two or more of these monomers can be mixed for copolymerization.

Also, the olefin polymer can be a homopolymer or a copolymer. When the olefin polymer is a copolymer of ethylene and other comonomer, the copolymer-forming monomer is preferably one or more comonomers selected from the group consisting of propylene, 1-butene, 1-hexene, 4-methyl-1-pentene and 1-octene.

Also, the comonomer is preferably contained in the amount of about 5 mol % to 20 mol % with respect to the content of octene, but not restricted thereto.

It is desirable that the olefin polymer is in the form of block, but not limited thereto.

The olefin polymer according to the present invention may be prepared in the presence of the above stated catalyst composition to show excellent physical properties such as the density of about 0.85 g/ml to 0.9 g/ml and melting point (Tm) of 100° C. or higher.

In the process for preparing the olefin polymer, the polymerization process using the catalyst composition is preferably carried out as a solution-phase process; or it is also carried out as a slurry-phase process or as a gas-phase process when the catalyst composition is used along with an inorganic carrier such as silica, etc.

Also, in the process for preparing the olefin polymer, the catalyst composition may be used after being dissolved in or diluted with a solvent suitable for the olefin polymerization process such as an aliphatic hydrocarbon solvent having 5 to 12 carbon atoms; preferably pentane, hexane, heptane, nonane, decane, or isomers thereof; an aromatic hydrocarbon solvent such as toluene and benzene; a hydrocarbon solvent substituted with chlorine such as dichloromethane and chlorobenzene; etc.

The solvent used herein is preferably applied after it is treated with a small amount of alkylaluminum to remove a small amount of water or air which acts as a catalyst poison. It is also possible to further use a promoter.

Hereinafter, the Examples are provided to assist the understanding of the present invention. However, the following Examples are only for the illustration of the present invention and it is not intended that the scope of the present invention is limited in any manner by them.

Preparation of Ethylene/1-Octene Copolymer

Example 1

To a 2 L autoclave reactor were introduced hexane solvent (about 1.0 L) and 1-octene diluted/prepared with hexane to about 0.7M (about 144 mL), and the reactor was pre-heated to about 100° C.

A 25 mL catalyst storage tank was charged by adding titanium compound (about 5.0 μmol) treated with triisobutylaluminum compound (about 125 μmol) and trityl tetrakis(pentafluorophenyl)borate (about 25 μmol) promoter compound in the order.

Subsequently, ethylene was added to the catalyst tank to the pressure of about 30 bar, about 2 μmol of Catalyst 1 compound, (E)-N-((1,2,3,4-tetrahydroquinoline-8-yl)methylene)-2-methylcyclohexanamine zirconiumbenzyl, and about 2 μmol of Catalyst 2 compound, 1,2,3,4-tetrahydro-8-(2,3,4-trimethyl-5-methylenecyclopenta-1,3-dienyl)quinoline dimethyltitanium, were injected to the reactor by using high pressurized argon, and the copolymerization reaction was carried out for about 10 min.

Then, the remaining ethylene gas was removed, and excess ethanol was added to the resulting polymer solution to induce precipitation. The polymer thus obtained was washed two to three times with ethanol and acetone, respectively, and dried for 12 h or more in a vacuum oven of about 80° C. to give the olefin copolymer.

The other conditions for polymerization are shown in the following Table 1, and the characteristics of thus prepared polymer such as molecular weight, etc. are shown in the following Table 2.

Example 2

The olefin copolymer was prepared according to the same procedure as Example 1 except that the amount of trityl tetrakis(pentafluorophenyl)borate promoter compound was about 30 μmol.

Example 3

The olefin copolymer was prepared according to the same procedure as Example 1 except that the amount of Catalyst 1 compound was about 3 μmol, the amount of Catalyst 2 compound was about 1 μmol, and the polymerization aid diethylzinc was further added in the amount of about 400 μmol (0.4 ml of hexane solution containing diethylzinc in the concentration of 1 M).

Example 4

The olefin copolymer was prepared according to the same procedure as Example 3 except that the amount of Catalyst 2 compound was about 2 μmol, the amount of promoter compound trityl tetrakis(pentafluorophenyl)borate was about 25 μmol, and the amount of diethylzinc was about 500 μmol.

Furthermore, melting point and heat of fusion of the olefin copolymer prepared in Example 4 were measured, and the results are depicted in FIG. 1.

Example 5

The olefin copolymer was prepared according to the same procedure as Example 3 except that the amount of Catalyst 2 compound was about 3 μmol, the amount of promoter compound trityl tetrakis(pentafluorophenyl)borate was about 30 μmol, and the amount of diethylzinc was about 600 μmol.

Example 6

The olefin copolymer was prepared according to the same procedure as Example 3 except that the amount of Catalyst 1 compound was about 1 μmol and the amount of Catalyst 2 compound was about 3 μmol.

Example 7

The olefin copolymer was prepared according to the same procedure as Example 4 except that the amount of Catalyst 1 compound was about 2 μmol and the amount of Catalyst 2 compound was about 3 μmol.

Example 8

The olefin copolymer was prepared according to the same procedure as Example 1 except that (E)-1,2,3,4-tetrahydro-N-((1,2,3,4-tetrahydroquinoline-8-yl)methylene)naphthalen-1-amine zirconiumbenzyl in the amount of about 3 μmol was used as the Catalyst 1 compound, the amount of Catalyst 2 compound was about 3 μmol, and the amount of the promoter compound was about 30 μmol.

Examples 9 to 12

Examples 9 to 12 were carried out to prepare olefin copolymers in the same procedure as Example 8, except that the conditions for polymerization were controlled as shown in the following Table. 1

Comparative Example 1

The olefin copolymer was prepared according to the same procedure as Example 1 except that Dow company's Catalyst (1) and Catalyst (2) having the following structures were used.

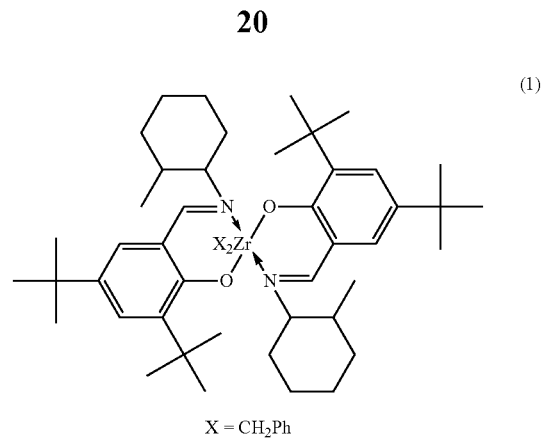

(1)

X = $CH_2Ph$

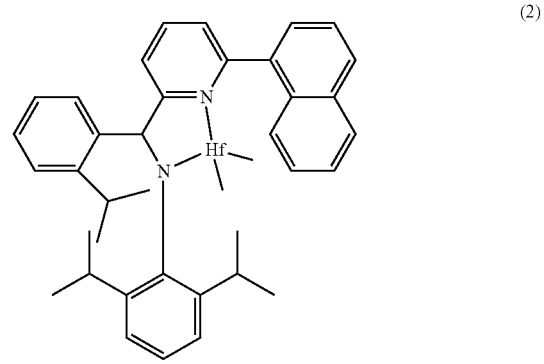

(2)

Comparative Examples 2 to 4

Comparative Examples 2 to 4 were carried out to prepare olefin copolymers in the same procedure as Comparative Example 1, except that the conditions for polymerization were controlled as shown in the following Table 1.

TABLE 1

| | Temperature (° C.) | Ethylene Pressure (bar) | 1-Octene Concentration (M) | Catalyst (1) (μmol) | Catalyst (2) (μmol) | Promoter (μmol) | Diethylzinc (ml) |
|---|---|---|---|---|---|---|---|
| Com. Ex. 1 | 120 | 30 | 0.7 | 5 | 7 | 60 | 0.30 |
| Com. Ex. 2 | 100 | 30 | 0.7 | 5 | 7 | 60 | 0.30 |
| Com. Ex. 3 | 140 | 30 | 0.7 | 5 | 7 | 60 | 0.30 |
| Com. Ex. 4 | 120 | 30 | 0.7 | 5 | 7 | 60 | 0.30 |
| Ex. 1 | 120 | 30 | 0.7 | 2 | 2 | 20 | 0.00 |
| Ex. 2 | 120 | 30 | 0.7 | 3 | 3 | 30 | 0.00 |
| Ex. 3 | 120 | 30 | 0.7 | 3 | 1 | 20 | 0.40 |
| Ex. 4 | 120 | 30 | 0.7 | 3 | 2 | 25 | 0.50 |
| Ex. 5 | 120 | 30 | 0.7 | 3 | 3 | 30 | 0.60 |
| Ex. 6 | 120 | 30 | 0.7 | 1 | 3 | 20 | 0.40 |
| Ex. 7 | 120 | 30 | 0.7 | 2 | 3 | 25 | 0.50 |
| Ex. 8 | 120 | 30 | 0.7 | 3 | 3 | 30 | 0.00 |
| Ex. 9 | 120 | 30 | 0.7 | 3 | 3 | 30 | 0.18 |
| Ex. 10 | 120 | 30 | 0.7 | 3 | 3 | 30 | 0.30 |
| Ex. 11 | 120 | 30 | 0.7 | 3 | 3 | 30 | 0.60 |
| Ex. 12 | 120 | 30 | 0.7 | 3 | 3 | 25 | 1.20 |

Experimental Examples

Physical properties of the olefin copolymers prepared in the above Examples and Comparative Examples were evaluated according to the following methods, and the results are shown in the following Table 2.

1) Melt Index (MI):
Melt index (MI) of a polymer is measured according to ASTM D-1238 (Condition E, 190° C., 2.16 Kg Load).

2) Density:
A sample is prepared by 180° C. press mold to a sheet having the thickness of 3 mm and the radius of 2 cm, which is then cooled at a rate of 10° C./min. The sample thus obtained is measured on a Mettler scale.

3) Melting Point (Tm):
DSC (Differential Scanning calorimeter, manufactured by TA Co.) curve is obtained by raising the temperature to 200° C., keeping the same temperature for 5 min, lowering the temperature to 30° C., and then raising the temperature again. The top of the curve is the melting point sought to be obtained. Here, the rate of raising or lowering the temperature is 10° C./min, and the melting point is determined from the section wherein the temperature is raised for the second time.

4) Heat of Fusion (J/mol):
Heat of fusion is measured by using DSC (Differential Scanning calorimeter, manufactured by TA Co.).

5) Polydispersity Index (PDI):
Number average molecular weight (Mn) and weight average molecular weight (Mw) are measured by the gel permeation chromatography (GPC), and the weight average molecular weight is divided by the number average molecular weight to calculate the PDI.

a compound having a ligand of the following formula (1) coordinated with a group IV transition metal; and
a compound of the following formula (2):

[Formula 1]

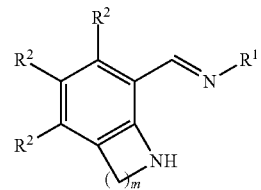

in the formula (1),
m denotes an integer of 1 to 7,
$R^1$ represents cycloalkyl having 4 to 10 carbon atoms which is substituted by one or more substituents selected from the group consisting of hydrogen, deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms, and heterocycle having 4 to 20 carbon atoms; heterocycle having 3 to 9 carbon atoms which is substituted by one or more substituents selected from the group consisting of hydrogen, deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20

TABLE 2

| | Activity (kg/mmol · hr) | MI (g/10 min) | Density (g/ml) | Tm (° C.) | Heat of Fusion (J/mol) | 1-Octene (mol %) | Molecular Weight (Mw) | PDI |
|---|---|---|---|---|---|---|---|---|
| Com. Ex. 1 | 39.30 | 4.3 | 0.892 | 126.24 | 48.85 | 6.8 | 47868 | 2.97 |
| Com. Ex. 2 | 43.83 | 4.5 | 0.890 | 125.18 | 45.15 | 6.8 | 45892 | 2.99 |
| Com. Ex. 3 | 5.35 | 0.8 | 0.910 | 127.34 | 65.20 | 4.8 | 52364 | 2.87 |
| Com. Ex. 4 | 42.53 | 4.7 | 0.892 | 126.05 | 44.41 | 6.9 | 50245 | 2.95 |
| Ex. 1 | 80.10 | 1.0 | 0.856 | 62.13 125.86 | 15.33 32.38 | 7.3 | 88779 | 3.94 |
| Ex. 2 | 68.54 | 1.6 | 0.861 | 58.45 124.72 | 9.25 21.68 | 9.8 | 81519 | 3.64 |
| Ex. 3 | 77.85 | 2.6 | 0.887 | 126.68 | 52.41 | 7.6 | 71595 | 3.48 |
| Ex. 4 | 75.24 | 9.6 | 0.882 | 126.17 | 55.87 | 8.5 | 53736 | 4.34 |
| Ex. 5 | 58.70 | 5.5 | 0.867 | 125.32 | 34.78 | 9.0 | 56050 | 3.37 |
| Ex. 6 | 90.15 | 3.3 | 0.862 | 124.57 | 10.23 | 16.2 | 89065 | 2.59 |
| Ex. 7 | 66.84 | 1.8 | 0.872 | 120.59 | 33.83 | 12.0 | 100258 | 3.64 |
| Ex. 8 | 73.70 | 0.9 | 0.862 | 60.41 124.93 | 20.45 5.66 | 12.4 | 93391 | 3.98 |
| Ex. 9 | 44.20 | 1.9 | 0.876 | 124.49 | 19.41 | 8.8 | 74451 | 2.90 |
| Ex. 10 | 40.20 | 1.9 | 0.881 | 124.84 | 26.84 | 7.6 | 73179 | 2.97 |
| Ex. 11 | 32.30 | 4.1 | 0.887 | 125.42 | 40.21 | 6.8 | 64748 | 2.79 |
| Ex. 12 | 14.70 | 5.3 | 0.896 | 126.32 | 56.83 | 6.5 | 51334 | 2.85 |

As is shown from the above Table 2, Examples 1 to 12 exhibit excellent catalytic activity and the olefin copolymers prepared therein have excellent heat resistance. Also, according to Examples 1 to 12, it can be seen that the values of density, heat resistance and melt index of the olefin copolymers can be controlled.

The invention claimed is:
1. A catalyst composition for olefin polymerization, which comprises carbon atoms, silyl, alkylaryl having 7 to 20 carbon atoms, arylalkyl having 7 to 20 carbon atoms, and heterocycle having 4 to 20 carbon atoms and which contains oxygen (O), nitrogen (N) or sulfur (S) as the hetero atom; aryl having 6 to 10 carbon atoms which is substituted by one or more substituents selected from the group consisting of hydrogen, deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms, and heterocycle having 4 to 20 carbon atoms; or heteroaryl having 5 to 10 carbon atoms which is substituted by one or more substituents selected from the group consisting of hydrogen, deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms, and heterocycle having 4 to 20 carbon atoms and which contains oxygen (O), nitrogen (N) or sulfur (S) as the hetero atom; wherein the groups adjacent to each other may form an aliphatic condensed ring or an aromatic condensed ring when $R^1$ is substituted by two or more substituents;

$R^2$ is the same or different and independently of one another is selected from the group consisting of hydrogen, deuterium, halogen, nitrile, acetylene, amine, amide, ester, ketone, alkyl having 1 to 20 carbon atoms, alkenyl having 2 to 20 carbon atoms, aryl having 6 to 20 carbon atoms, heterocycle having 4 to 20 carbon atoms, alkoxy having 1 to 20 carbon atoms and aryloxy having 6 to 20 carbon atoms; and two or more $R^2$s may be combined with each other to form an aliphatic or aromatic ring;

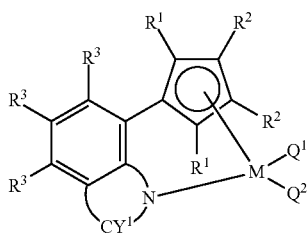

[Formula 2]

in the formula (2), $R^1$ and $R^2$ independently of one another represent hydrogen, alkyl having 1 to 20 carbon atoms, aryl having 1 to 20 carbon atoms, silyl, alkenyl having 1 to 20 carbon atoms, alkylaryl having 1 to 20 carbon atoms, arylalkyl having 1 to 20 carbon atoms, or a metalloid radical of group XIV metal which is substituted by hydrocarbyl; and said $R^1$ and $R^2$ may be combined with each other via an alkylidene radical including alkyl having 1 to 20 carbon atoms or aryl having 1 to 20 carbon atoms to form a ring;

$R^3$ independently of one another represents hydrogen, halogen, alkyl having 1 to 20 carbon atoms, aryl having 1 to 20 carbon atoms, alkoxy having 1 to 20 carbon atoms, aryloxy having 1 to 20 carbon atoms or amido; and two or more $R^3$s may be combined with each other to form an aliphatic or aromatic ring;

$CY^1$ represents a substituted or unsubstituted aliphatic or aromatic ring;

M represents a group IV transition metal; and $Q^1$ and $Q^2$ independently of one another represent halogen, alkyl having 1 to 20 carbon atoms, arylamido having 1 to 20 carbon atoms, alkenyl having 1 to 20 carbon atoms, aryl having 1 to 20 carbon atoms, alkylaryl having 1 to 20 carbon atoms, arylalkyl having 1 to 20 carbon atoms or alkylidene having 1 to 20 carbon atoms.

2. The catalyst composition for olefin polymerization according to claim 1, wherein the catalyst composition further comprises one or more promoter compounds selected from the group consisting of the compounds of the following formulas (3) to (5):

$J(R^4)_3$     [Formula 3]

in the formula (3),

J represents aluminum or boron;

$R^4$ independently of one another represents halogen, or a hydrocarbyl radical which is unsubstituted or substituted by halogen and has 1 to 20 carbon atoms;

$[L-H]^+[ZA_4]^-$ or $[L]^+[ZA_4]^-$     [Formula 4]

in the formula (4),

L represents a neutral or cationic Lewis acid;

H represents hydrogen;

Z represents a group XIII atom;

A independently of one another represents alkyl having 1 to 20 carbon atoms or aryl having 6 to 20 carbon atoms wherein one or more hydrogen atoms are replaced by halogen, hydrocarbyl having 1 to 20 carbon atoms, alkoxy having 1 to 20 carbon atoms or phenoxy;

—$[Al(R^5)-O]_a$—     [Formula 5]

in the formula (5), $R^5$ represents halogen, or hydrocarbyl which is unsubstituted or substituted by halogen and has 1 to 20 carbon atoms; and a denotes an integer of 2 or more.

3. The catalyst composition for olefin polymerization according to claim 2, wherein the promoter compound is contained with respect to the compound having a ligand of formula (1) coordinated with a group IV transition metal and the compound of formula (2) in the molar ratio of 1:1 to 1:20.

4. The catalyst composition for olefin polymerization according to claim 1, wherein the compound of formula (1) is represented by the following formula (1-1) or (1-2):

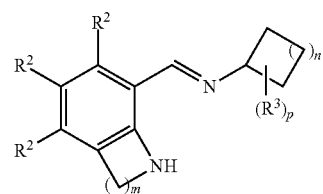

[Formula 1-1]

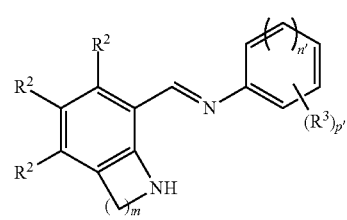

[Formula 1-2]

in the formula (1-1) or (1-2), m and $R^2$ are as defined in the formula (1), n denotes an integer of 1 to 7, n' denotes an integer of 1 to 5, p denotes an integer of 0 to 2+n, p' denotes an integer of 0 to 5+n', $R^3$ is the same or different and is one or more selected independently of one another from the group consisting of deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms and heterocycle having 4 to 20 carbon atoms; and two or more $R^3$s may be combined with each other to form an aliphatic or aromatic ring.

5. The catalyst composition for olefin polymerization according to claim 1, wherein the compound of formula (1) is one or more selected from the group consisting of the compounds of the following formula (1-3):

[Formula 1-3]

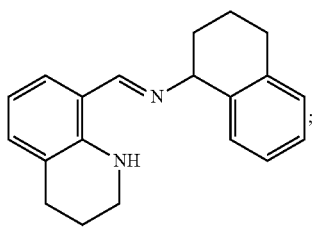

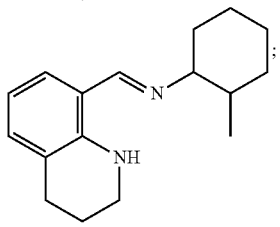

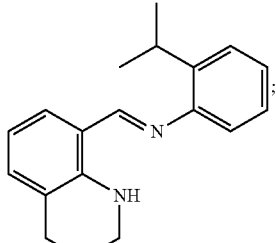

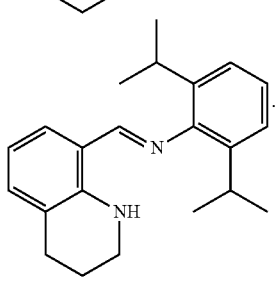

6. The catalyst composition for olefin polymerization according to claim 1, wherein the compound of formula (2) is represented by the following formula (2-1):

[Formula 2-1]

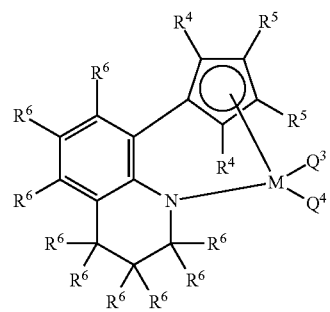

in the formula (2-1), $R^4$ and $R^5$ independently of one another represent hydrogen, alkyl having 1 to 20 carbon atoms, aryl having 1 to 20 carbon atoms, or silyl;

$R^6$ independently of one another represents alkyl having 1 to 20 carbon atoms, aryl having 1 to 20 carbon atoms, alkenyl having 1 to 20 carbon atoms, alkylaryl having 1 to 20 carbon atoms, arylalkyl having 1 to 20 carbon atoms, alkoxy having 1 to 20 carbon atoms, aryloxy having 1 to 20 carbon atoms or amido, and two or more $R^6$s may be combined with each other to form an aliphatic or aromatic ring;

$Q^3$ and $Q^4$ independently of one another represent halogen, alkyl having 1 to 20 carbon atoms, arylamido having 1 to 20 carbon atoms, alkenyl having 1 to 20 carbon atoms or aryl having 1 to 20 carbon atoms; and M represents a group IV transition metal.

7. A catalyst composition for olefin polymerization, which comprises a compound having a ligand of the following formula (1) coordinated with a group IV transition metal;

a compound of the following formula (2); and one or more polymerization aids selected from the group consisting of an aluminum compound comprising a hydrocarbyl substituent having 1 to 12 carbon atoms, a zinc compound comprising a hydrocarbyl substituent having 1 to 12 carbon atoms and a gallium compound comprising a hydrocarbyl substituent having 1 to 12 carbon atoms:

[Formula 1]

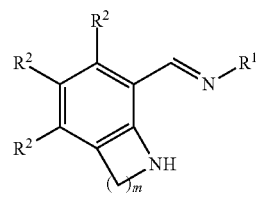

in the formula (1), m denotes an integer of 1 to 7, $R^1$ represents cycloalkyl having 4 to 10 carbon atoms which is substituted by one or more substituents selected from the group consisting of hydrogen, deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms, and heterocycle having 4 to 20 carbon atoms; heterocycle having 3 to 9 carbon atoms which is substituted by one or more substituents selected from the group consisting of hydrogen, deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms, and heterocycle having 4 to 20 carbon atoms and which contains oxygen (O), nitrogen (N) or sulfur (S) as the hetero atom; aryl having 6 to 10 carbon atoms which is substituted by one or more substituents selected from the group consisting of hydrogen, deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms, and heterocycle having 4 to 20 carbon atoms; or heteroaryl having 5 to 10 carbon atoms which is substituted by one or more substituents selected from the group consisting of hydrogen, deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms, and heterocycle having 4 to 20 carbon atoms and which contains oxygen (O), nitrogen (N) or sulfur (S) as the hetero atom; wherein the groups adjacent to each other may form an aliphatic condensed ring or an aromatic condensed ring when $R^1$ is substituted by two or more substituents;

$R^2$ is the same or different and independently of one another is selected from the group consisting of hydrogen, deuterium, halogen, nitrile, acetylene, amine, amide, ester, ketone, alkyl having 1 to 20 carbon atoms, alkenyl having 2 to 20 carbon atoms, aryl having 6 to 20 carbon atoms, heterocycle having 4 to 20 carbon atoms, alkoxy having 1 to 20 carbon atoms and aryloxy having 6 to 20 carbon atoms; and two or more $R^2$s may be combined with each other to form an aliphatic or aromatic ring;

[Formula 2]

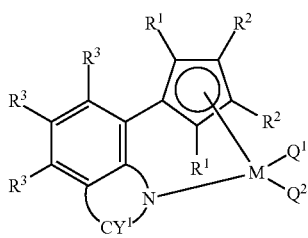

in the formula (2), $R^1$ and $R^2$ independently of one another represent hydrogen, alkyl having 1 to 20 carbon atoms, aryl having 1 to 20 carbon atoms, silyl, alkenyl having 1 to 20 carbon atoms, alkylaryl having 1 to 20 carbon atoms, arylalkyl having 1 to 20 carbon atoms, or a metalloid radical of group XIV metal which is substituted by hydrocarbyl; and said $R^1$ and $R^2$ may be combined with each other via an alkylidene radical including alkyl having 1 to 20 carbon atoms or aryl having 1 to 20 carbon atoms to form a ring;

$R^3$ independently of one another represents hydrogen, halogen, alkyl having 1 to 20 carbon atoms, aryl having 1 to 20 carbon atoms, alkoxy having 1 to 20 carbon atoms, aryloxy having 1 to 20 carbon atoms or amido; and two or more $R^3$s may be combined with each other to form an aliphatic or aromatic ring;

$CY^1$ represents a substituted or unsubstituted aliphatic or aromatic ring;

M represents a group IV transition metal; and $Q^1$ and $Q^2$ independently of one another represent halogen, alkyl having 1 to 20 carbon atoms, arylamido having 1 to 20 carbon atoms, alkenyl having 1 to 20 carbon atoms, aryl having 1 to 20 carbon atoms, alkylaryl having 1 to 20 carbon atoms, arylalkyl having 1 to 20 carbon atoms or alkylidene having 1 to 20 carbon atoms.

8. The catalyst composition for olefin polymerization according to claim 7, wherein the catalyst composition further comprises one or more promoter compounds selected from the group consisting of the compounds of the following formulas (3) to (5):

$$J(R^4)_3 \qquad \text{[Formula 3]}$$

in the formula (3),

J represents aluminum or boron;

$R^4$ independently of one another represents halogen, or a hydrocarbyl radical which is unsubstituted or substituted by halogen and has 1 to 20 carbon atoms;

$$[L-H]^+[ZA_4]^- \text{ or } [L]^+[ZA_4]^- \qquad \text{[Formula 4]}$$

in the formula (4),

L represents a neutral or cationic Lewis acid;

H represents hydrogen;

Z represents a group XIII atom;

A independently of one another represents alkyl having 1 to 20 carbon atoms or aryl having 6 to 20 carbon atoms wherein one or more hydrogen atoms are replaced by halogen, hydrocarbyl having 1 to 20 carbon atoms, alkoxy having 1 to 20 carbon atoms or phenoxy;

$$-[Al(R^5)-O]_a- \qquad \text{[Formula 5]}$$

in the formula (5), $R^5$ represents halogen, or hydrocarbyl which is unsubstituted or substituted by halogen and has 1 to 20 carbon atoms; and a denotes an integer of 2 or more.

9. The catalyst composition for olefin polymerization according to claim 7, wherein the polymerization aid is contained with respect to the compound having a ligand of formula (1) coordinated with a group IV transition metal and the compound of formula (2) in the molar ratio of 1:10 to 1:1000.

10. The catalyst composition for olefin polymerization according to claim 7, wherein the compound of formula (1) is represented by the following formula (1-1) or (1-2):

[Formula 1-1]

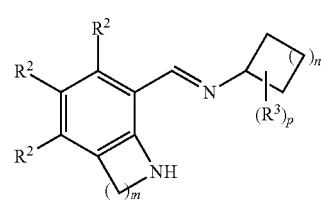

-continued

[Formula 1-2]

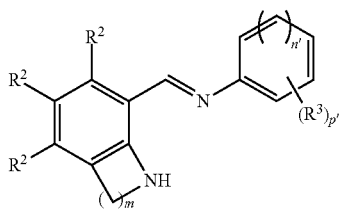

in the formula (1-1) or (1-2),
m and $R^2$ are as defined in the formula (1),
n denotes an integer of 1 to 7, n' denotes an integer of 1 to 5,
p denotes an integer of 0 to 2+n, p' denotes an integer of 0 to 5+n',
$R^3$ is the same or different and is one or more selected independently of one another from the group consisting of deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms and heterocycle having 4 to 20 carbon atoms; and two or more $R^3$s may be combined with each other to form an aliphatic or aromatic ring.

11. The catalyst composition for olefin polymerization according to claim 7, wherein the compound of formula (2) is represented by the following formula (2-1):

[Formula 2-1]

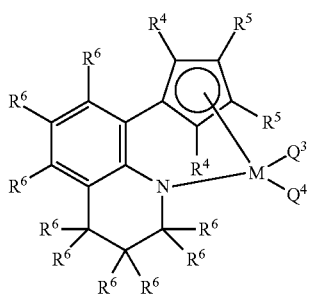

in the formula (2-1),
$R^4$ and $R^5$ independently of one another represent hydrogen, alkyl having 1 to 20 carbon atoms, aryl having 1 to 20 carbon atoms, or silyl;
$R^6$ independently of one another represents alkyl having 1 to 20 carbon atoms, aryl having 1 to 20 carbon atoms, alkenyl having 1 to 20 carbon atoms, alkylaryl having 1 to 20 carbon atoms, arylalkyl having 1 to 20 carbon atoms, alkoxy having 1 to 20 carbon atoms, aryloxy having 1 to 20 carbon atoms or amido, and two or more $R^6$s may be combined with each other to form an aliphatic or aromatic ring;
$Q^3$ and $Q^4$ independently of one another represent halogen, alkyl having 1 to 20 carbon atoms, arylamido having 1 to 20 carbon atoms, alkenyl having 1 to 20 carbon atoms or aryl having 1 to 20 carbon atoms; and
M represents a group IV transition metal.

12. A process for preparing the catalyst composition for olefin polymerization, which comprises a step of obtaining a mixture by contacting the compound having a ligand of the following formula (1) coordinated with a group IV transition metal and the compound of the following formula (2) with
one or more promoter compounds selected from the group consisting of the compounds of the following formulas (3) to (5):

[Formula 1]

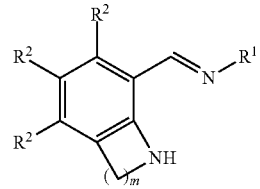

in the formula (1),
m denotes an integer of 1 to 7,
$R^1$ represents cycloalkyl having 4 to 10 carbon atoms which is substituted by one or more substituents selected from the group consisting of hydrogen, deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms, and heterocycle having 4 to 20 carbon atoms; heterocycle having 3 to 9 carbon atoms which is substituted by one or more substituents selected from the group consisting of hydrogen, deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms, and heterocycle having 4 to 20 carbon atoms and which contains oxygen (O), nitrogen (N) or sulfur (S) as the hetero atom; aryl having 6 to 10 carbon atoms which is substituted by one or more substituents selected from the group consisting of hydrogen, deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms, and heterocycle having 4 to 20 carbon atoms; or heteroaryl having 5 to 10 carbon atoms which is substituted by one or more substituents selected from the group consisting of hydrogen, deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms, and heterocycle having 4 to 20 carbon atoms and which contains oxygen (O), nitrogen (N) or sulfur (S) as the hetero atom; wherein the groups adjacent to each other may form an aliphatic condensed ring or an aromatic condensed ring when $R^1$ is substituted by two or more substituents;
$R^2$ is the same or different and independently of one another is selected from the group consisting of hydrogen, deuterium, halogen, nitrile, acetylene, amine, amide, ester, ketone, alkyl having 1 to 20 carbon atoms, alkenyl having 2 to 20 carbon atoms, aryl having 6 to 20 carbon atoms, heterocycle having 4 to 20 carbon atoms, alkoxy having 1 to 20 carbon atoms and aryloxy having 6 to 20 carbon atoms; and two or more $R^2$s may be combined with each other to form an aliphatic or aromatic ring;

[Formula 2]

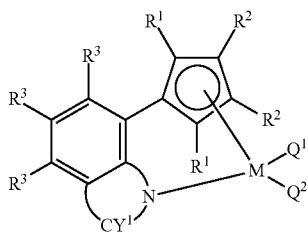

in the formula (2), $R^1$ and $R^2$ independently of one another represent hydrogen, alkyl having 1 to 20 carbon atoms, aryl having 1 to 20 carbon atoms, silyl, alkenyl having 1 to 20 carbon atoms, alkylaryl having 1 to 20 carbon atoms, arylalkyl having 1 to 20 carbon atoms, or a metalloid radical of group XIV metal which is substituted by hydrocarbyl; and said $R^1$ and $R^2$ may be combined with each other via an alkylidene radical including alkyl having 1 to 20 carbon atoms or aryl having 1 to 20 carbon atoms to form a ring;

$R^3$ independently of one another represents hydrogen, halogen, alkyl having 1 to 20 carbon atoms, aryl having 1 to 20 carbon atoms, alkoxy having 1 to 20 carbon atoms, aryloxy having 1 to 20 carbon atoms or amido; and two or more $R^3$s may be combined with each other to form an aliphatic or aromatic ring;

$CY^1$ represents a substituted or unsubstituted aliphatic or aromatic ring;

M represents a group IV transition metal;

$Q^1$ and $Q^2$ independently of one another represent halogen, alkyl having 1 to 20 carbon atoms, arylamido having 1 to 20 carbon atoms, alkenyl having 1 to 20 carbon atoms, aryl having 1 to 20 carbon atoms, alkylaryl having 1 to 20 carbon atoms, arylalkyl having 1 to 20 carbon atoms or alkylidene having 1 to 20 carbon atoms;

$J(R^4)_3$     [Formula 3]

in the formula (3),

J represents aluminum or boron;

$R^4$ independently of one another represents halogen, or a hydrocarbyl radical which is unsubstituted or substituted by halogen and has 1 to 20 carbon atoms;

$[L-H]^+[ZA_4]^-$ or $[L]^+[ZA_4]^-$     [Formula 4]

in the formula (4),

L represents a neutral or cationic Lewis acid;

H represents hydrogen;

Z represents a group XIII atom;

A independently of one another represent alkyl having 1 to 20 carbon atoms or aryl having 6 to 20 carbon atoms wherein one or more hydrogen atoms are replaced by halogen, hydrocarbyl having 1 to 20 carbon atoms, alkoxy having 1 to 20 carbon atoms or phenoxy;

$-[Al(R^5)-O]_a-$     [Formula 5]

in the formula (5), $R^5$ represents halogen, or hydrocarbyl which is unsubstituted or substituted by halogen and has 1 to 20 carbon atoms; and a denotes an integer of 2 or more.

13. The process for preparing the catalyst composition for olefin polymerization according to claim 12, wherein the promoter compound is contained with respect to the compound having a ligand of formula (1) coordinated with a group IV transition metal and the compound of formula (2) in the molar ratio of 1:1 to 1:20.

14. The process for preparing the catalyst composition for olefin polymerization according to claim 12, wherein the compound of formula (1) is represented by the following formula (1-1) or (1-2):

[Formula 1-1]

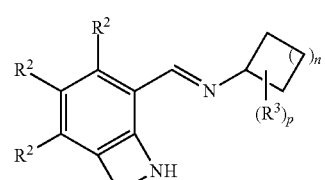

[Formula 1-2]

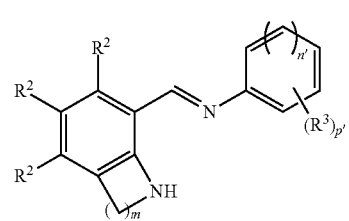

in the formula (1-1) or (1-2), m and $R^2$ are as defined in the formula (1), n denotes an integer of 1 to 7, n' denotes an integer of 1 to 5, p denotes an integer of 0 to 2+n, p' denotes an integer of 0 to 5+n', $R^3$ is the same or different and is one or more selected independently of one another from the group consisting of deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms and heterocycle having 4 to 20 carbon atoms; and two or more $R^3$s may be combined with each other to form an aliphatic or aromatic ring.

15. A process for preparing the catalyst composition for olefin polymerization, which comprises the steps of obtaining a mixture by contacting the compound having a ligand of the following formula (1) coordinated with a group IV transition metal and the compound of the following formula (2) with one or more promoter compounds selected from the group consisting of the compounds of the following formulas (3) to (5); and adding one or more polymerization aids selected from the group consisting of an aluminum compound comprising a hydrocarbyl substituent having 1 to 12 carbon atoms, a zinc compound comprising a hydrocarbyl substituent having 1 to 12 carbon atoms and a gallium compound comprising a hydrocarbyl substituent having 1 to 12 carbon atoms to said mixture:

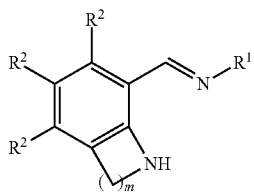
[Formula 1]

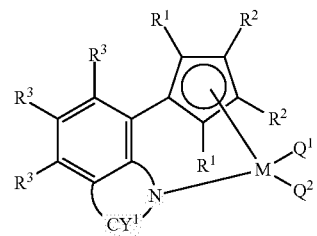
[Formula 2]

in the formula (1), m denotes an integer of 1 to 7,

R$^1$ represents cycloalkyl having 4 to 10 carbon atoms which is substituted by one or more substituents selected from the group consisting of hydrogen, deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms, and heterocycle having 4 to 20 carbon atoms; heterocycle having 3 to 9 carbon atoms which is substituted by one or more substituents selected from the group consisting of hydrogen, deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms, and heterocycle having 4 to 20 carbon atoms and which contains oxygen (O), nitrogen (N) or sulfur (S) as the hetero atom; aryl having 6 to 10 carbon atoms which is substituted by one or more substituents selected from the group consisting of hydrogen, deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms, and heterocycle having 4 to 20 carbon atoms; or heteroaryl having 5 to 10 carbon atoms which is substituted by one or more substituents selected from the group consisting of hydrogen, deuterium, halogen, nitrile, acetylene, amine, amide, ester, ketone, alkyl having 1 to 20 carbon atoms, cycloalkyl having 6 to 20 carbon atoms, alkenyl having 2 to 20 carbon atoms, aryl having 6 to 20 carbon atoms, silyl, alkylaryl having 7 to 20 carbon atoms, arylalkyl having 7 to 20 carbon atoms, and heterocycle having 4 to 20 carbon atoms and which contains oxygen (O), nitrogen (N) or sulfur (S) as the hetero atom; wherein the groups adjacent to each other may form an aliphatic condensed ring or an aromatic condensed ring when R$^1$ is substituted by two or more substituents;

R$^2$ is the same or different and independently of one another is selected from the group consisting of hydrogen, deuterium, halogen, nitrile, acetylene, amine, amide, ester, ketone, alkyl having 1 to 20 carbon atoms, alkenyl having 2 to 20 carbon atoms, aryl having 6 to 20 carbon atoms, heterocycle having 4 to 20 carbon atoms, alkoxy having 1 to 20 carbon atoms and aryloxy having 6 to 20 carbon atoms; and two or more R$^2$s may be combined with each other to form an aliphatic or aromatic ring;

in the formula (2),

R$^1$ and R$^2$ independently of one another represent hydrogen, alkyl having 1 to 20 carbon atoms, aryl having 1 to 20 carbon atoms, silyl, alkenyl having 1 to 20 carbon atoms, alkylaryl having 1 to 20 carbon atoms, arylalkyl having 1 to 20 carbon atoms, or a metalloid radical of group XIV metal which is substituted by hydrocarbyl; and said R$^1$ and R$^2$ may be combined with each other via an alkylidene radical including alkyl having 1 to 20 carbon atoms or aryl having 1 to 20 carbon atoms to form a ring;

R$^3$ independently of one another represents hydrogen, halogen, alkyl having 1 to 20 carbon atoms, aryl having 1 to 20 carbon atoms, alkoxy having 1 to 20 carbon atoms, aryloxy having 1 to 20 carbon atoms or amido; and two or more R$^3$s may be combined with each other to form an aliphatic or aromatic ring;

CY$^1$ represents a substituted or unsubstituted aliphatic or aromatic ring;

M represents a group IV transition metal;

Q$^1$ and Q$^2$ independently of one another represent halogen, alkyl having 1 to 20 carbon atoms, arylamido having 1 to 20 carbon atoms, alkenyl having 1 to 20 carbon atoms, aryl having 1 to 20 carbon atoms, alkylaryl having 1 to 20 carbon atoms, arylalkyl having 1 to 20 carbon atoms or alkylidene having 1 to 20 carbon atoms;

J(R$^4$)$_3$ [Formula 3]

in the formula (3),

J represents aluminum or boron;

R$^4$ independently of one another represents halogen, or a hydrocarbyl radical which is unsubstituted or substituted by halogen and has 1 to 20 carbon atoms;

[L-H]$^+$[ZA$_4$]$^-$ or [L]$^+$[ZA$_4$]$^-$ [Formula 4]

in the formula (4),

L represents a neutral or cationic Lewis acid;

H represents hydrogen;

Z represents a group XIII atom;

A independently of one another represents alkyl having 1 to 20 carbon atoms or aryl having 6 to 20 carbon atoms wherein one or more hydrogen atoms are replaced by halogen, hydrocarbyl having 1 to 20 carbon atoms, alkoxy having 1 to 20 carbon atoms or phenoxy;

—[Al(R$^5$)—O]$_a$— [Formula 5]

in the formula (5),

R$^5$ represents halogen, or hydrocarbyl which is unsubstituted or substituted by halogen and has 1 to 20 carbon atoms; and a denotes an integer of 2 or more.

16. The process for preparing the catalyst composition for olefin polymerization according to claim 15, wherein the polymerization aid is contained with respect to the compound having a ligand of formula (1) coordinated with a group IV transition metal and the compound of formula (2) in the molar ratio of 1:10 to 1:1000.

17. The process for preparing the catalyst composition for olefin polymerization according to claim 15, wherein the promoter compound is contained with respect to the compound having a ligand of formula (1) coordinated with a group IV transition metal and the compound of formula (2) in the molar ratio of 1:1 to 1:20.

18. A process for preparing an olefin polymer, which comprises a step of polymerizing olefin monomers in the presence of the catalyst composition according to claim 1.

19. A process for preparing an olefin polymer, which comprises a step of polymerizing olefin monomers in the presence of the catalyst composition according to claim 7.

* * * * *